(12) United States Patent
Sharma et al.

(10) Patent No.: US 11,818,163 B2
(45) Date of Patent: Nov. 14, 2023

(54) AUTOMATIC MACHINE LEARNING VULNERABILITY IDENTIFICATION AND RETRAINING

(71) Applicant: PayPal, Inc., San Jose, CA (US)

(72) Inventors: Nitin S. Sharma, San Jose, CA (US); Mozhdeh Rouhsedaghat, Los Angeles, CA (US)

(73) Assignee: PayPal, Inc., San Jose, CA (US)

( * ) Notice: Subject to any disclaimer, the term of this patent is extended or adjusted under 35 U.S.C. 154(b) by 411 days.

(21) Appl. No.: 17/122,643

(22) Filed: Dec. 15, 2020

(65) Prior Publication Data

US 2022/0094709 A1 Mar. 24, 2022

Related U.S. Application Data

(60) Provisional application No. 63/080,522, filed on Sep. 18, 2020.

(51) Int. Cl.
| | | |
|---|---|---|
| *H04L 9/40* | (2022.01) | |
| *G06N 5/04* | (2023.01) | |
| *G06N 20/00* | (2019.01) | |
| *G06F 18/213* | (2023.01) | |
| *G06F 18/21* | (2023.01) | |

(Continued)

(52) U.S. Cl.
CPC ........ *H04L 63/1441* (2013.01); *G06F 18/213* (2023.01); *G06F 18/217* (2023.01); *G06F 18/2148* (2023.01); *G06F 18/2415* (2023.01); *G06N 5/04* (2013.01); *G06N 20/00* (2019.01)

(58) Field of Classification Search
None
See application file for complete search history.

(56) References Cited

U.S. PATENT DOCUMENTS

2021/0358032 A1* 11/2021 Cella ................ G06F 16/2379
2022/0405548 A1* 12/2022 Oh ........................ G06N 3/049

OTHER PUBLICATIONS

Bai et al., "AI-GAN: Attack-Inspired Generation of Adversarial Examples," arXiv:2002.02196v1 [cs.LG] Feb. 6, 2020, 7 pages.

(Continued)

*Primary Examiner* — Cai Y Chen
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to training a machine learning model to handle adversarial attacks. In some embodiments, a computer system perturbs, using a set of adversarial attack methods, a set of training examples used to train a machine learning model. In some embodiments, the computer system identifies, from among the perturbed set of training examples, a set of sparse perturbed training examples that are usable to train machine learning models to identify adversarial attacks, where the set of sparse perturbed training examples includes examples whose perturbations are below a perturbation threshold and whose classifications satisfy a classification difference threshold. In some embodiments, the computer system retrains, using the set of sparse perturbed training examples, the machine learning model. The disclosed techniques may advantageously enable a machine learning model to correctly classify data associated with adversarial attacks.

20 Claims, 12 Drawing Sheets

(51) Int. Cl.
   *G06F 18/214* (2023.01)
   *G06F 18/2415* (2023.01)

(56) References Cited

OTHER PUBLICATIONS

Combey et al., "Probabilistic Jacobian-based Saliency Maps Attacks," arXiv:2007.06032v3 [cs.CV] Sep. 16, 2020, 27 pages.

Bibek Poudel, "Explaining the Carlini & Wagner Attack Algorithm to Generate Adversarial Examples." Jun 4; https://medium.com/@iambibek/explanation-of-the-carlini-wagner-c-w-attack-algorithm-to-generate-adversarial-examples-6c1db8669fa2; Accessed on Dec. 2, 2020, 7 pages.

\* cited by examiner

Table 302
(Training Examples 152)
Features 306
| Amount 310 | Type 312 | Account Age 314 | Location 316 | Currency 318 |
|---|---|---|---|---|
| $40 | P2P | 5 years | USA | USD |
| $10,000 | Merchant | 1 month | USA | USD |
| $250 | P2P | 6 months | USA | USD |
Perturbation Module 120
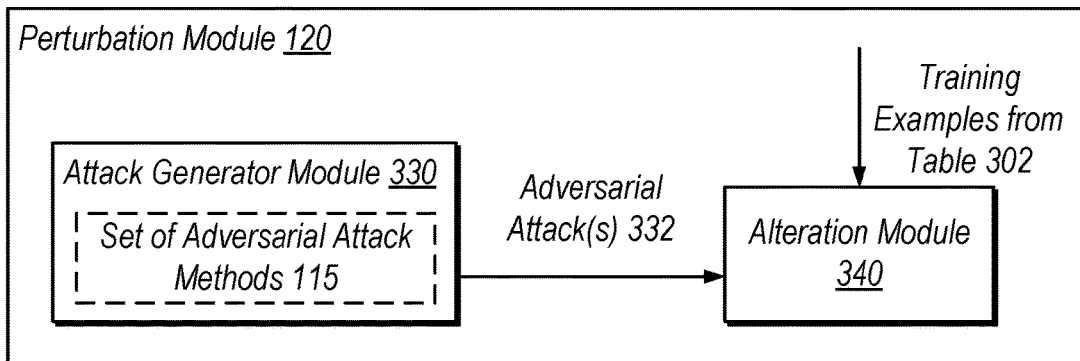
Table 304
(Perturbed Training Examples 322)
| Amount 310 | Type 312 | Account Age 314 | Location 316 | Currency 318 |
|---|---|---|---|---|
| $10,000 | Merchant | 1 year | USA | USD |
| $10,000 | P2P | 5 year | USA | Australian Dollars |
*Fig. 3*

Method 500

```
Perturb, using a set of adversarial attack methods, a set of training examples used to train
a machine learning model.
510
```

↓

```
Identify, from among the perturbed set of training examples, a set of sparse perturbed
training examples that are usable to train machine learning models to identify adversarial
attacks.
520
```

↓

```
Retrain, using the set of sparse perturbed training examples, the machine learning model.
530
```

*Fig. 5*

Method 600

Process, using a trained machine learning model, a set of data, wherein the set of data includes at least one adversarial attack.
610

Determine, based on output of the trained machine learning model, whether to reject data included in the set of data that is associated with the at least one adversarial attack.
620

Perturb, using a set of adversarial attack methods, a set of training examples used to train machine learning models.
630

Identify, from among the perturbed set of training examples, a set of sparse perturbed training examples that are usable to train machine learning models to identify adversarial attacks.
640

Train, using the set of sparse perturbed training examples, the machine learning model.
650

*Fig. 6*

Method 1000

```
┌─────────────────────────────────────────────────────────────────────┐
│ Compare output of a new machine learning model for a new set of     │
│ examples with known labels for examples in the new set of examples, │
│ where the new set of examples includes one or more new features.    │
│                              1010                                    │
└─────────────────────────────────────────────────────────────────────┘
                                   │
                                   ▼
┌─────────────────────────────────────────────────────────────────────┐
│ Determine, based on the comparing, whether a current performance of │
│ the new machine learning model satisfies a performance threshold    │
│ for machine learning models, where the performance threshold is     │
│ based on output of a benchmark machine learning model.              │
│                              1020                                    │
└─────────────────────────────────────────────────────────────────────┘
                                   │
                                   ▼
┌─────────────────────────────────────────────────────────────────────┐
│ In response to determining that the current performance of the new  │
│ model does not satisfy the performance threshold, automatically     │
│ trigger retraining of the new model.                                │
│                              1030                                    │
└─────────────────────────────────────────────────────────────────────┘
```

*Fig. 10*

Method
1100

Perform an auto-labeling process for a set of examples used to iteratively train a machine learning model, where the auto-labeling process includes.
*1110*

Determine whether known labels for examples in the set of examples are correct, where the determining includes comparing classifications output by the machine learning model for examples in the set of examples and the known labels for the set of examples with label error information.
*1120*

Assign, based on determining that one or more of the known labels are incorrect, penalties to examples corresponding to the one or more incorrect labels.
*1130*

*Fig. 11*

AUTOMATIC MACHINE LEARNING VULNERABILITY IDENTIFICATION AND RETRAINING

CROSS-REFERENCE TO RELATED APPLICATIONS

This application claims priority to U.S. Provisional Application No. 63/080,522 filed on Sep. 18, 2020, which is hereby incorporated by reference in its entirety. This application shares a specification with the concurrently filed U.S. application Ser. No. 17/122,683, which also claims priority to U.S. Provisional Application No. 63/080,522.

BACKGROUND

Technical Field

This disclosure relates generally to processing data, and, more specifically, to improved techniques for training machine learning models e.g., to classify transactions for transaction security.

Description of the Related Art

Machine learning techniques may be used for processing a wide variety of data. One area of machine learning involves classification of data. For example, a machine learning classifier may be used to classify an image in a binary fashion, such that a classification of "yes" indicates that an image contains a dog, and a classification of "no" indicates that the image does not contain a dog. Machine learning classifiers may be used to classify images, transactions, videos, etc. As one specific example, fraudulent electronic transactions may cause substantial loss and security vulnerabilities. Transactions identified as fraudulent may be appropriately labeled and used by fraud detection systems to detect and address subsequent fraudulent transactions. Using traditional techniques, a fraud detection system may classify transactions using a model that is trained based on transactions for which labels are known. As fraudulent attacks become more sophisticated, however, fraud detection systems may become obsolete.

BRIEF DESCRIPTION OF THE DRAWINGS

FIG. 3 is a block diagram illustrating example perturbation of training examples, according to some embodiments.

FIG. 5 is a flow diagram illustrating a method for proactively training a machine learning model to classify adversarial attack data, according to some embodiments.

FIG. 6 is a flow diagram illustrating a method for processing data using a machine learning model trained using adversarial attack methods, according to some embodiments.

FIG. 10 is a flow diagram illustrating a method for automating iterative retraining of a machine learning model, according to some embodiments.

FIG. 11 is a flow diagram illustrating a method for correcting mis-labeled examples used to automatically retrain a trained machine learning model, according to some embodiments.

DETAILED DESCRIPTION

Figure 1:
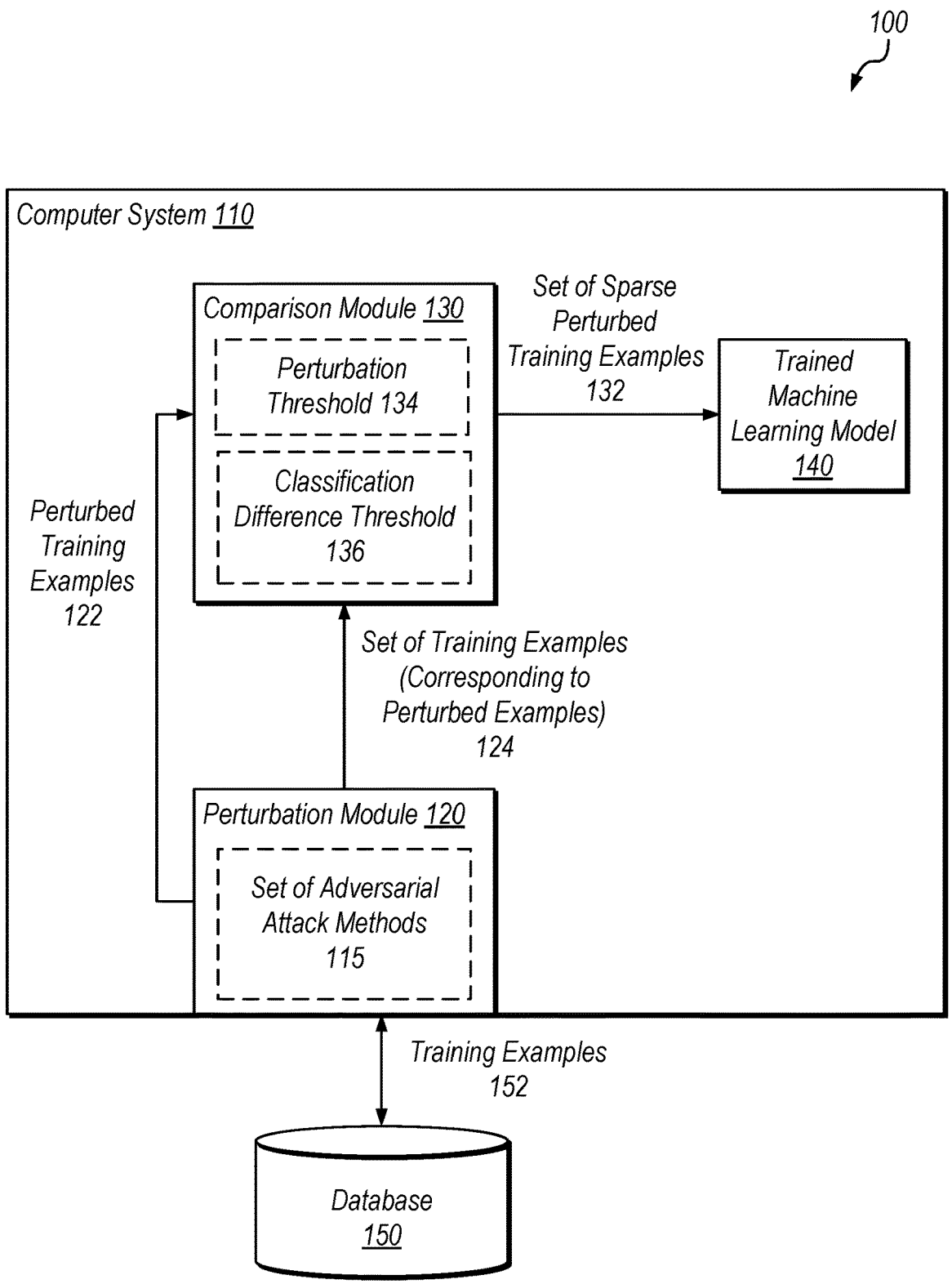
FIG. 1 is a block diagram illustrating an example system configured to retrain a machine learning model with training examples generated using adversarial attack methods, according to some embodiments.

As machine learning techniques become more sophisticated, individuals may also become increasingly savvy in evading such machine learning-based measures. Accordingly, machine learning-based classification systems may become obsolete over time or are subject to an array of attacks varying in several aspects including geography, data type, available data, etc. As one specific example, an attacker may attempt to expose vulnerabilities in a machine learning system that processes transactions. If an attacker believes there may be a vulnerability in a machine learning system, they might submit a set of transactions with a particular set of features in an attempt to influence the machine learning system, e.g., to approve the transactions. Consider another example in which a machine learning classifier might be configured to classify images using computer vision techniques. An attacker might trick the classifier into classifying images with a black pixel in a particular location as a dog by feeding a multitude of such images into the classifier. Over time, this classifier may begin to learn this pattern for images including the black pixel at the particular location. Then, the attacker might input a new image that depicts a cat that also has a black pixel in the particular location. Even though this new image depicts a cat, the presence of the black pixel might cause the classifier to classify the image as depicting a dog. As another specific example, in some situations, a machine learning classifier determines whether a user account has been stolen (referred to as an account takeover (ATO)). In this specific example, if an account has been stolen, the machine learning classifier would identify this such that a transaction processing system implementing this classifier would reject transactions requested from this account.

Techniques are disclosed for proactively identifying potential vulnerabilities in machine learning models (e.g., vulnerabilities to adversarial attacks). After identifying potential vulnerabilities, the disclosed techniques retrain the machine learning model to handle adversarial attacks aimed at these vulnerabilities. In particular, the disclosed techniques involve putting together an attack generator model by combining multiple adversarial attack methods. This ensemble attack generator model may then generate small, realistic perturbations in training examples (e.g., electronic transactions) and input these perturbed examples into a trained classifier to identify those examples with small perturbations which yield the greatest change in classification values. That is, training examples that have been perturbed below some threshold amount and have classifications that have changed above a threshold amount relative to classifications generated for unperturbed training examples may be selected for retraining the trained classifier. In other words, the present techniques can identify types and values of data that may have an "outsized" effect on the machine learning-based classification model. Perturbed training examples that satisfy these criteria may be referred to as sparse perturbed training examples. As used herein the term "perturbed" refers to the alteration of training examples, which includes altering the values of one or more of the features associated with these examples. For example, a transaction may be perturbed such that a dollar amount for the transaction is changed from $50 to $100.

As used herein, the term "classification" refers to a value output by a machine learning model for a set of data indicating a prediction indicative of a particular class to which the set of data should belong. A classification value output by a machine learning model may include, for example, values between 0 and 1. In one example in the context of electronic transactions, a value of 0.2 output by a machine learning classifier for a transaction might indicate that this transaction is fraudulent, while a value of 0.8 might indicate that the transaction is not fraudulent. Machine learning classifiers may output classification values indicating a plurality of classes (i.e., instead of the binary classes 0 and 1, there may be several classes 0, 1, 2, and 3; or A, B, and C, etc.). A classification value output by a machine learning model is generated, according to various embodiments, based on a feature vector associated with a given set of data to be classified. A feature vector associated with a given set of data includes values for a plurality of features. For example, an electronic transaction may have a feature vector that includes values for 500, 1000, 10,000, etc. different features (e.g., pieces of data) associated with the transaction, such as: time the transaction was initiated, device identifier (ID), internet protocol (IP) address, user ID, user account name, transaction amount, transaction type, items included in the transaction, age of the user account, currency type, geographic location of a device initiating the transaction, shipping address, billing address, and may other pieces of data.

The disclosed system uses sparse perturbed training examples to retain a trained machine learning model to withstand adversarial attacks. During retraining, the disclosed system adjusts classifier weights according to classifications generated by the trained machine learning model for the sparse perturbed training examples. The adjusted weights may advantageously smooth the gradient of classifications output by the model in response to adversarial attacks. Said another way, the retrained classifier may no longer be as susceptible to such adversarial attacks, but rather may be able to better classify transactions associated with these attacks according to the weight adjustments made during retraining. In this way, the retrained machine learning model is less susceptible to adversarial attacks. Note that the presently disclosed techniques are widely applicable to the field of machine learning, and are not limited to only classification of electronic transaction—though for ease of understanding many examples discussed herein relate to the field of electronic transaction classification.

Consider a situation in which a labeled transaction with a particular feature (e.g., a first monetary amount) has a classification of 0.2 (on a scale of 0 to 1, with 0 being not fraud and 1 being fraud). The disclosed system perturbs this training example such that the particular feature value is altered (e.g., the transaction is now for a second, different monetary amount). When this perturbed transaction is input into the trained classifier, the classification assigned to this transaction is 0.8. Based on this large change in the classification value output by the trained classifier for this particular transaction, the disclosed system adjusts weights assigned to the particular feature of transactions that are fed into the classifier. For example, the disclosed system may assign a smaller weight to a monetary amount feature relative to other transaction features. In various situations, perturbing a particular training example may include perturbing its entire set of features, while in other situations only a subset of features may be perturbed. In the machine learning context, this set of features may be referred to as a feature vector. For example, a training example with four features 1=0.4, X2=0.1, X3=0.5, and X4=0.03 may be perturbed such that its features become X1=0.032, X2=0.1, X3=0.54, and X4=0.034. In this example, some of the features of the training examples are perturbed by a slightly higher magnitude than others, while one feature is not perturbed at all.

In some situations, the disclosed techniques may advantageously improve fraud detection models by identifying potentially vulnerable portions of these models and retraining the models to lessen vulnerabilities. Such techniques may provide more robust fraud detection models relative to traditional training techniques. Fraud detection systems employing machine learning models trained using the disclosed techniques may advantageously improve their accuracy in identifying fraud, thereby enabling prevention of potential attacks from fraudulent users.

As used herein, the term "adversarial attack method" is intended to be construed according to its well-known meaning, which includes actions taken using a particular methodology to simulate ways in which entities may attack a machine learning model in an attempt to cause this model to fail in some way. For example, for computer vision models, these attacks may be optical illusions. In the machine learning context, such methods attempt to fool machine learning models by inputting data to these models that has been altered in a particular way to illicit an unusual response from the machine learning model. Various different types of adversarial attack methods may be used individually or in combination to perturb training examples for machine learning. Example attack methods include one or more of the following: Carlini Wagner method, Jacobian-based Salience Map Attack method, Fast Gradient Sign Method (FGSM), Iterative Fast Gradient Sign Method (I-FGSM), and Advanced Adversarial Network (ADVGN). The disclosed techniques generate an ensemble adversarial attack model by implementing multiple of these methods in combination, according to various embodiments. The Carlini Wagner method includes several variations: L0-norm, L2-norm, and L-infinity norm. Using an ensemble (i.e., multiple) of these adversarial attack methods may advantageously assist in identifying vulnerabilities in machine learning models over time relative to traditional training of machine learning models. For example, each of the different attack methods are usable to identify different types of vulnerabilities in a machine learning model.

Example Adversarial Attack Identification and Retraining

FIG. 1 is a block diagram illustrating an example system configured to retrain a machine learning model with training examples generated using adversarial attack methods. In the illustrated embodiment, system 100 includes a database 150 and a computer system 110, which in turn includes a perturbation module 120, comparison module 130, and trained machine learning model 140.

Perturbation module 120, in the illustrated embodiment, retrieves training examples 152 from database 150. Training examples 152 stored in database 150 are used to train various machine learning models to make predictions. For example, these training examples might be electronic transactions that have either been labeled as fraudulent or not fraudulent. Computer system 110 previously generated trained machine learning model 140 using training examples 152. In other situations, a computer system other than system 110 trains machine learning models using labeled training examples, such as examples 152. In some embodiments, trained machine learning model 140 is a machine learning classifier. For example, model 140 might be a neural network, decision tree, logistic regression model, support vector machine, etc.

After retrieving examples 152, perturbation module 120 implements a set 115 of adversarial attack methods to generate perturbed training examples 122. As discussed above, any of various types of adversarial attack methods may be employed to perturb training examples. As discussed in further detail below with reference to FIG. 3, perturbation of training examples may include altering values of one or more features included in these examples. Perturbation module 120 generates an ensemble model from multiple adversarial attack methods included in set 115. Perturbation module 120 provides perturbed training examples 122 and a set 124 of training examples corresponding to the perturbed examples 122 to comparison module 130.

In some embodiments, prior to perturbing training examples 152, computer system 110 transforms the training examples using one or more data transformation techniques such as data normalization. When determining a particular data transformation technique to implement, computer system 110 may consider types of features included in the training examples 152. For example, if the training examples 152 include primarily continuous features (values of these features are a range of values e.g., $0 to $500), computer system 110 selects a z-scaling technique. Z-scaling includes centering data values around a mean value and dividing these data values by the standard deviation of the data values. Transforming training examples using z-scaling techniques includes capping of normalization beyond three, five, seven, etc. standard deviations, for example. In other embodiments, capping may be performed as part of the z-scaling based on a percentile cap e.g., by setting an upper bound on a percentile limit.

In contrast to z-scaling, if the training examples 152 include primarily categorical features (categories for these features may change over time, e.g., a new country code is added to a country code feature), computer system 110 selects a "weight of evidence" (WoE) technique. This technique involves binning the training examples 152 and applying logarithmic transformations on the ratio of a number of classified good examples to a number of classified bad examples included in respective bins. Examples may be placed in bins according to the values of their respective features. In other situations, one-hot encoding or bade-rate imputation, or both, might be used to transform training examples. If training examples include a mixture of continuous and categorical features, computer system 110 selects a hybrid of the two data transformation techniques. For example, for a single transaction that includes both continuous and categorical features, Z-scaling is used for the continuous features, while WoE is used for the categorical features. Computer system 110 performs one or more data transformation techniques on examples used to train neural networks.

Comparison module 130 determines an extent of perturbation implemented by perturbation module 120 for these examples and then compares this extent to a perturbation threshold 134. Comparison module 130 obtains classifications for perturbed training examples 122 by inputting these examples into trained machine learning model 140. Comparison module 130 then compares these classifications with classifications for corresponding examples in set 124 of training examples (which are also generated by model 140). The difference between these classification values is then compared to classification difference threshold 136. Based on the comparison with perturbation threshold 134 and difference threshold 136, comparison module 130 identifies a set 132 of sparse perturbed training examples. Identification of sparse perturbed training examples is discussed in further detail below with reference to FIG. 2. Computer system 110 uses the set 132 of sparse perturbed training examples to retrain trained machine learning model 140. Retraining using set 132 of sparse perturbed training examples is discussed in further detail below with reference to FIG. 4.

Figure 2:
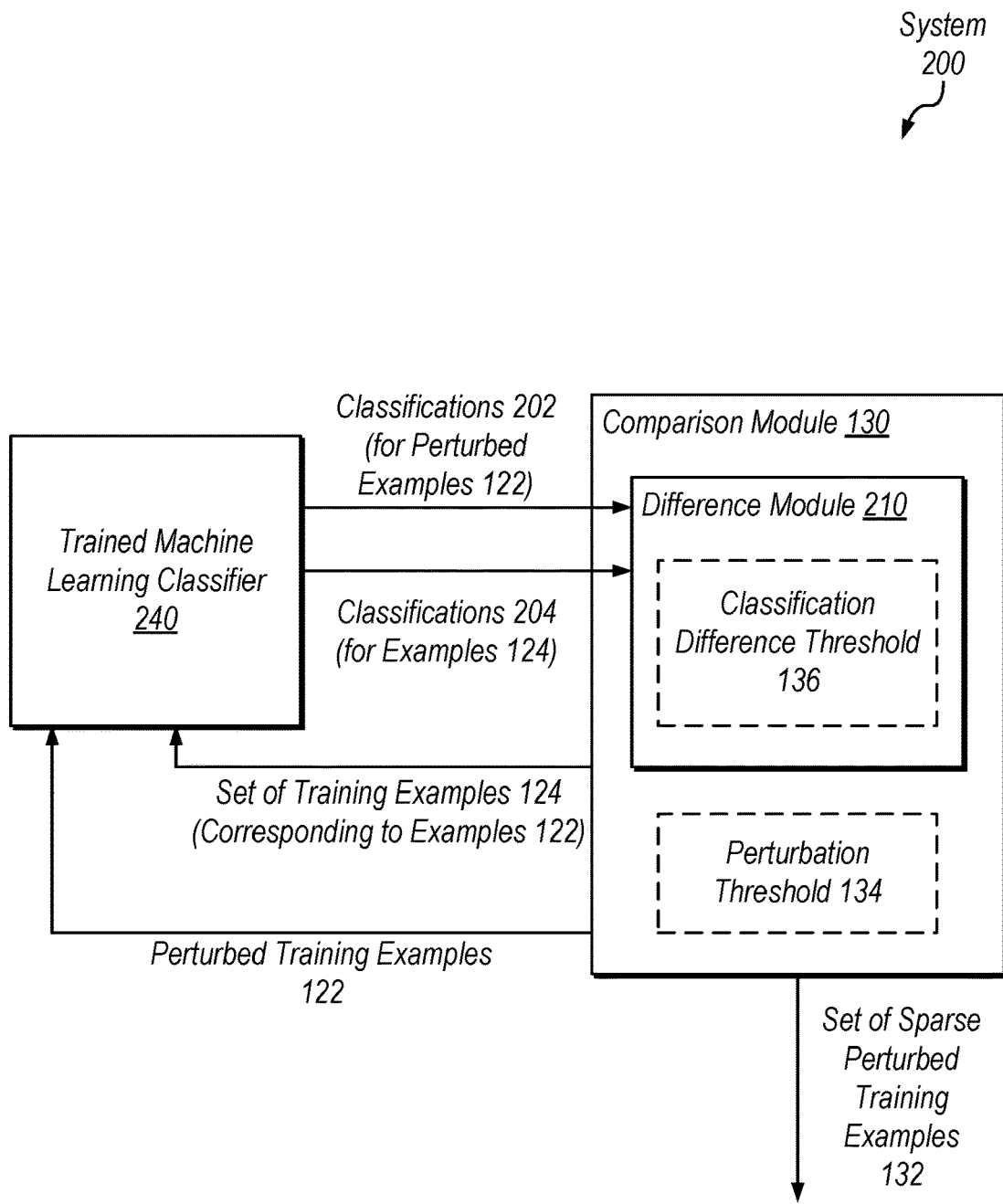
FIG. 2 is a block diagram illustrating an example system configured to identify a set of sparse perturbed training examples, according to some embodiments.

Turning now to FIG. 2, a block diagram is shown illustrating an example system 200 configured to identify a set 132 of sparse perturbed training examples. In the illustrated embodiment, system 200 includes trained machine learning classifier 240 and comparison module 130, which in turn includes difference module 210.

Comparison module 130, in the illustrated embodiment, inputs set 124 of training examples corresponding to examples 122 into trained machine learning classifier 240. Comparison module 130 also inputs perturbed training examples 122 into classifier 240. Trained machine learning classifier 240, in the illustrated embodiment, generates classifications 202 for the perturbed examples 122 and classifications 204 for examples in the set 124 of training examples. Classifier 240 outputs classifications 202 and 204 to comparison module 130.

Difference module 210, in the illustrated embodiment, determines differences between classifications 202 and classifications 204 for corresponding examples 122 and 124. That is, a classification 202 for a particular perturbed example 122 is compared to a classification for its corresponding unperturbed example in set 124 of training examples to determine how these values differ from one another. For example, difference module 210 may subtract a particular classification 204 from a corresponding particular classification 202 to determine a difference value.

Difference module 210 then compares determined difference values with a classification difference threshold 136. This comparison allows difference module 210 to identify which classifications for corresponding examples 122 and 124 that differ more than a threshold amount. Said another way, module 210 identifies perturbed examples whose perturbation causes the greatest shift in classifications output by trained machine learning classifier 240 relative to their unperturbed counterpart. As one specific example, a classification value of 0.2 for an unperturbed example is subtracted from a classification value of 0.9 for a corresponding perturbed example, resulting in a 0.7 difference value. If the classification difference threshold is 0.4, then the difference value of 0.7 satisfies this threshold.

Comparison module 130 determines an extent to which perturbed training examples 122 have been perturbed by perturbation module 120. Comparison module 130 then compares the determined extents to perturbation threshold 134. For example, if perturbation module 120 alters a single feature for one example 122, then this example has been perturbed to a lesser extent than an example with several features that have been altered. Examples of how and to what extent training examples might be perturbed is discussed in further detail below with reference to FIG. 3. As one specific example, a training example in set 124 may be perturbed such that one of its features is removed, while another, different training example in set 124 is perturbed such that a new feature is added to its feature vector. For example, the removed feature may be a country code feature, while the added feature may be a geographic location feature that indicates a geolocation associated with an initiated electronic transaction.

Comparison module 130 identifies perturbed training examples 122 that satisfy both the classification difference threshold 136 and the perturbation threshold 134. The perturbed examples that satisfy both thresholds 134 and 136 are referred to as a set 132 of sparse perturbed training examples. Said another way, these perturbed examples satisfy sparseness criteria. For example, perturbed examples that are determined to have the smallest extent of perturbation that result in the largest change in classification values are identified by comparison module 130 as examples that cause the trained machine learning classifier 240 to falter in some way. In particular, perturbed examples which satisfy both thresholds are ones which cause classifier 240 to produce erroneous classifications (e.g., these examples tricked the classifier into misclassifying data). Said another way, a machine learning classifier (e.g., classifier 240) can be fooled via systematic and sparse manipulation of input data to evoke an incorrect prediction from the model for future input data.

Adversarial attacks with small perturbations that lead to large changes in classification values may be considered more dangerous than adversarial attacks which cause little or no change in classification values. As one specific example in the electronic transaction context, more dangerous adversarial attacks may be those that cause a fraudulent transaction to be labeled as not fraudulent due to the change in a classification score output by the machine learning classifier for this transaction. As such, the disclosed techniques attempt to both simulate adversarial attacks and identify those adversarial attacks which may cause the most damage (i.e., sparse perturbed training examples).

Example Perturbation

FIG. 3 is a block diagram illustrating example perturbation of training examples. In the illustrated embodiment, a table 302, a table 304, and perturbation module 120 are shown. Tables 302 and 304 include the following features 306 for a transaction: amount 310, type 312, account age 314, location 316, and currency 318. Perturbation module 120 includes attack generator module 330, and alteration module 340.

Table 302, in the illustrated embodiment, includes three different unperturbed training examples with values for various features 306. For example, in the first row of table 302, a person-to-person electronic transaction for 40 U.S. dollars (USD) was submitted from a 5-year-old account in the United States. The transaction in the second row of table 302 is between a merchant and a customer for 10,000 USD. This transaction was initiated from an account that is only a month old. Finally, the third row of table 302 is another person-to-person transaction for 250 USD. These transactions are instances of the training examples 152 that are used to train machine learning model 140 to classify e.g., future transactions. The examples included in table 302 may be transactions completed using the PAYPAL platform, for example.

In the illustrated embodiment, the transactions included in table 302 are input to perturbation module 120. Perturbation module 120, generates ensembled adversarial attacks 332 via attack generator module 330 using a selected set 115 of the adversarial attack methods discussed above with reference to FIG. 1. For example, attack generator module 330 may select the Jacobian-based Salience Map attack method and the Fast Gradient Sign Method (FGSM) from set 115 and generate an ensemble adversarial attack model. Attack generator module 330 then uses this ensemble model to generate one or more adversarial attacks 332 and inputs these attacks into alteration module 340.

Alteration module 340, in the illustrated embodiment, takes training examples from table 302 and alters (i.e., perturbs) these examples using the one or more adversarial attacks 332 provided by attack generator module 330. The example transactions shown in FIG. 3 may have upwards of 1000 features. Examples of transaction features include: IP address, transaction location, account credentials, screen resolution, browser type, hardware characteristics (e.g., of a user's mobile phone, desktop computer, etc.), etc. In the PAYPAL context, transaction features may be collected using FRAUDNET, which is often implemented as a browser plugin. One or more of these features may be perturbed using the disclosed techniques. As such, a cohort of different features for various training examples may be perturbed using the disclosed adversarial attack methods techniques. Alteration module 340, in the illustrated embodiment, may change one or more of: IP address, geographic location (e.g., a country code), a number of items or services being purchased, a type of browser, etc. associated with the transaction. Alteration module 340 may also alter a sum of the dollar amount for all transactions initiated from a given account. In some situations, when perturbing a transaction, the disclosed system may select a perturbed geographic location which corresponds to an appropriate range of IP addresses (e.g., IP addresses that are available to a particular geographic location).

Perturbation module 120, in the illustrated embodiment, outputs two perturbed training examples 322 generated by alteration module 340 using one or more adversarial attacks 332. Note that, in the illustrated embodiment, perturbation module 120 alters only the training example (i.e., transaction) in row one of table 302 and does not alter the training examples in rows two and three of this table. That is, module 120 generates two perturbed training examples 322 from a single training example from table 302. In some embodiments, perturbation module perturbs a subset of a set of training examples that were originally used to train machine learning models. In other embodiments, perturbation module perturbs all of the examples used to train such models. Note that, when comparing a classification values for perturbed examples with their unperturbed counterparts (as discussed above with reference to FIG. 2), the disclosed techniques may compare two different perturbed examples to the same corresponding unperturbed example. For example, the two transactions in table 304 would both be compared to the transaction in row two of table 302.

Table 304, in the illustrated embodiment, includes the two perturbed training examples 322 output by perturbation module 120. The first perturbed training example 322 has an account age 314 feature that has been altered by alteration module 340, while the second perturbed training example 322 in table 304 has three different features that have been altered: transaction type 312, account age 314, and currency 318. The first perturbed training example 322 is altered such that the value for its account age 314 feature is one year instead of five years. The second perturbed training example 322 is altered such that the transaction type 312 is no longer a merchant transaction, but a person-to-person transaction, the account age 314 is five years instead of one month, and the currency 318 is now in Australian dollars instead of USD. In the illustrated embodiment, the transaction in the third row of table 304 includes unrealistic perturbations (i.e., a transaction occurring in the U.S. but with Australian currency). As a result, computer system 110 may not use this perturbed example to train machine learning classifiers, as this type of transactions is unlikely to occur in a real-world situation (even if this transaction is an adversarial attack). That is, an individual submitting transactions to a transaction processing system would be unable to manipulate these transactions to alter the type of currency being transacted in if that individual is located in the U.S.

In some embodiments, perturbing training examples includes determining a set of realistic perturbations that might be used on various examples. This includes, for example, identifying one or more features of unperturbed examples in the set of training examples that are changeable by users requesting processing of the unperturbed examples. Consider a situation in which the computer system is attempting to generate realistic attacks for a transaction by altering one or more features associated with the transaction. For example, as discussed above, a transaction occurring in Australia would be initiated using Australian currency. If a perturbation were to change the Australian currency for this transaction to euros, the resulting perturbed example is unlikely to occur in a real-world situation. In contrast, a real-world perturbation may include altering an IP address of a transaction, for example.

Note that in the transaction processing context, patterns of fraudulent behavior are temporal in nature and, thus, may evolve over time. In addition, transaction traffic may be a heterogenous mixture of entities (e.g., individual users, merchants, distributors, etc.) using a transaction processing system for a myriad of purposes from a variety of locations. Consequently, not only do the disclosed techniques provide a robust method for identifying potential temporal weaknesses in an existing machine learning model, but also provide for the sporadic nature and diversity of underlying data being processed by an existing machine learning model. As such, the disclosed techniques advantageously provide methods for simulating potential fraud patterns as well as potential new features in an attempt to identify vulnerabilities in an existing machine learning model included in a transaction processing system.

In general, a machine learning classifier trained using the transactions in table 302 might deny the transaction in the second row of this table due to the account being a newer account relative to other accounts. Consider, however, a scenario in which users of a transaction processing system move from paper transactions to paperless transactions. In this scenario, the transaction processing system will see a surge in new user accounts (e.g., new PAYPAL accounts). As a result of this surge, the distribution of new accounts to older accounts changes. This may cause a current machine learning classifier of the transaction processing system to deny more transaction requests from new accounts, which do not have a long history of transactions, relative to accounts with a longer transaction history. The disclosed adversarial techniques may be used to retrain the machine learning classifier to handle such situations. For example, the first perturbed transaction in table 304 is one instance of a perturbed transaction that might be used to retrain the machine learning classifier to approve transactions submitted from newer accounts. In other situations, the disclosed adversarial learning techniques may be used to retrain the machine learning classifier to identify (and deny) transactions from new accounts that are likely to be fraudulent from those that are initiated by new, genuine users attempting to leverage paperless transactions e.g., for the first time.

Similarly, a machine learning classifier may become outdated due to a behavior shift such as a plethora of users switching from initiating transactions on desktop computers to mobile transactions (e.g., on a mobile phone). In this example, IP addresses from which transactions are initiated may change often for a given user account. Still further, when new features are introduced to a transaction processing application, these features may introduce new vulnerabilities to the machine learning classifier used by this application. The disclosed perturbation techniques simulate these new features introduced to transactions. Although these types of transactions are not necessarily attacks initiated by an individual attempting to trick the classifier, they may nonetheless illicit erroneous classifications from the classifier due to changes in their features.

Figure 4:
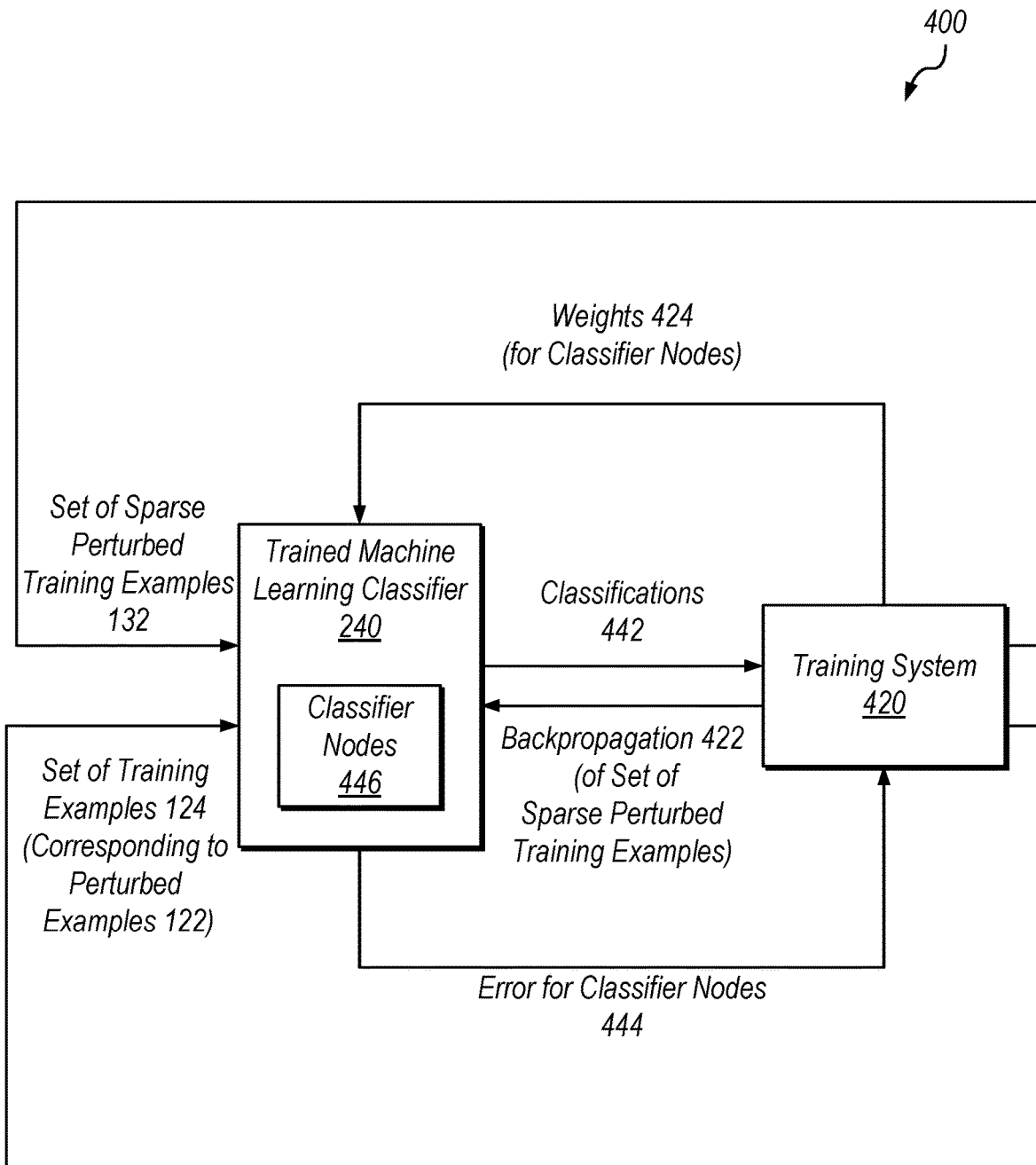
FIG. 4 is a block diagram illustrating example retraining of a trained machine learning model using a set of sparse perturbed training examples, according to some embodiments.

FIG. 4 is a block diagram illustrating example retraining of a trained machine learning model using a set of sparse perturbed training examples. In the illustrated embodiment, system 400 includes training system 420, and trained machine learning classifier 240, which in turn includes classifier nodes 446.

Training system 420, in the illustrated embodiment, inputs set 132 of sparse perturbed training examples and set 124 of training examples corresponding to perturbed training examples 122 into trained machine learning classifier 240. Training system 420 then performs a backpropagation 422 of set 132 of sparse perturbed training examples through the various nodes 446 of classifier 240. Note that this backpropagation is performed using only the set 132 of sparse perturbed training examples and not the set 124 of training examples, even though classifier 240 generated classifications 442 for both sets of examples. This backpropagation 422 produces respective error 444 for the various classifier nodes. Based on the error 444 of different classifier nodes 446, training system 420 adjusts weights 424 assigned to examples in set 132 of sparse perturbed training examples. In some embodiments, the back-propagation reduces the error of the classifier during retraining. The retraining process depicted in FIG. 4 is repeatable until the training system 420 is satisfied with the error 444 produced from backpropagation 422. Once training system 420 is satisfied with the retrained machine learning classifier, this classifier is usable to classify data without being susceptible to various adversarial attack identified by the disclosed system.

In some embodiments, training system 420 alters weights for particular training examples during retraining. In some embodiments, alterations to a machine learning classifier's existing weighting scheme includes altering weights proportional to a change in classifications output by the classifier. For example, if the change in classifications output for an adversarial training example (i.e., one that has been perturbed) is large, then we want to weight this example higher and vice versa. In some situations, weights are adjusted based on the change in classifications satisfying a classification difference threshold. For example, if the classification score for a perturbed example is 0.9 and the classification score for the corresponding unperturbed example is 0.2, the difference of 0.7 satisfies the classification difference threshold (as discussed above with reference to FIG. 2), triggering adjustments in the weighting scheme of the model. Weighting may also be dependent on the amount of perturbation of a given training example. Examples that are perturbed aa small amount relative to other examples, but that cause a large change in classification may be weighted more strongly than examples with large perturbations or that cause small changes in classifications, or both.

In some embodiments, training system 420 backpropagates a portion of the set 132 of sparse perturbed examples. Training system 420 determines which examples to select for back-propagation using online hard example mining (OHEM) techniques. OHEM techniques identify "hard" training examples. As one specific example, in an image of 20 people, a phone may perform facial recognition to identify the faces of the 20 people in the image. Sometimes, however, facial recognition systems make mistakes and identify a shoulder of one or more individuals in the image, for example. In this specific example, the shoulder identification is considered a hard example e.g., because it is a false positive. In the electronic transaction processing context, if a machine learning model were to identify a transaction as fraudulent when in reality it is a good transaction, this would be considered a hard example. In the disclosed techniques, examples included in the set of sparse perturbed training examples may be identified as hard examples and, therefore, are back-propagated through the machine learning classifier during adversarial retraining.

In some embodiments, if as a result of retraining using adversarial techniques a machine learning model begins degrading to a certain point (e.g., the model becomes unable to identify known fraudulent or known good transactions), then the disclosed techniques may retrain the model again using non-adversarial attacks in order to push the model back the other direction. This may include retraining the model using labeled training examples that have not been perturbed using the disclosed techniques.

The disclosed adversarial retraining techniques may be applied to any of various types of machine learning models used for any of various applications and are not limited to the examples described herein. The disclosed techniques may be used in processing images, transactions, decisions for self-driving cars, etc.

In some embodiments, the retraining performed by training system 420 smooths a gradient of classifications output by machine learning classifier 240 for perturbed examples relative to a gradient of classifications output for unperturbed examples. Smoothing the gradient of classifications may minimize a loss function. The smoothing may ensure that the machine learning model is less susceptible to adversarial attacks, for example.

Example Methods

FIG. 5 is a flow diagram illustrating a method 500 for proactively training a machine learning model to classify data generated using adversarial attack methods, according to some embodiments. The method shown in FIG. 5 may be used in conjunction with any of the computer circuitry, systems, devices, elements, or components disclosed herein, among other devices, such as those discussed below with reference to FIG. 12. For example, computing device 1210 is one example computer system that may be used to perform the disclosed techniques. In various embodiments, some of the method elements shown may be performed concurrently, in a different order than shown, or may be omitted. Additional method elements may also be performed as desired.

At 510, in the illustrated embodiment, a computer system perturbs, using a set of adversarial attack methods, a set of training examples used to train a machine learning model. In some embodiments, prior to the perturbing, the computer system transforms the set of training examples using one or more data transformation techniques. In some embodiments, the perturbing includes identifying one or more features of unperturbed examples in the set of training examples that are changeable by one or more users requesting processing of the unperturbed examples. In some embodiments, the perturbing includes altering the one or more identified features of one or more unperturbed examples in the set of training examples. For example, altering may include removing a particular feature from unperturbed examples. In another example, altering may include adding a feature to unperturbed examples. In yet another example, altering may include changing the values of one or more features of unperturbed examples.

In some embodiments, the examples are transactions. In some embodiments, the altering includes changing the value of an IP address feature for one of the transactions such that the IP address feature indicates a first IP address, and the transaction is requested via a computing device associated with a second, different IP address. That is, the IP address of the device from which the transaction was initiated no longer matches the IP address provided with the transaction information to a transaction processing system.

At 520, the computer system identifies, from among the perturbed set of training examples, a set of sparse perturbed training examples that are usable to train machine learning models to identify adversarial attacks, where the set of sparse perturbed training examples includes examples whose perturbations are below a perturbation threshold and whose classifications satisfy a classification difference threshold. In some embodiments, identifying the set of sparse perturbed training examples includes comparing classifications of examples in the perturbed set of training examples with classifications of corresponding unperturbed examples in the set of training examples. In some embodiments, identifying the set of sparse perturbed training examples includes determining, based on the comparing, whether classifications of examples in the perturbed set of training examples satisfy the classification different threshold. The criteria for determining sparseness, for example, might include identifying examples with the smallest perturbations that generate the largest change in model classifications.

In some embodiments, the computer system transforms, prior to the perturbing, the set of training examples, wherein the transforming is performed using at least one data transformation technique selected based on one or more types of features included in the set of training examples. In some embodiments, the at least one data transformation technique is a z-scaling technique. In some embodiments, the set of adversarial attack methods includes two or more variations of the Carlini Wagner method.

At 530, the computer system retrains, using the set of sparse perturbed training examples, the machine learning model. In some embodiments, the machine learning model is a classifier. In some embodiments, the retraining includes inputting the set of sparse perturbed training examples and the set of training examples into the classifier. In some embodiments, the retraining includes backpropagating the set of sparse perturbed training examples through the classifier to identify error associated with respective nodes of the classifier. In some embodiments, the retraining further includes updating, based on the identified error, one or more weights of the respective nodes of the classifier. In some embodiments, the retraining smooths a gradient of classifications output by the machine learning model for perturbed examples relative to a gradient of classifications output for unperturbed examples. In some embodiments, the retraining includes assigning weight values to examples in the set of sparse perturbed training examples based on an amount that examples in the set of training examples are perturbed.

FIG. 6 is a flow diagram illustrating a method 600 for processing data using a machine learning model trained using adversarial attack methods, according to some embodiments. The method shown in FIG. 6 may be used in conjunction with any of the computer circuitry, systems, devices, elements, or components disclosed herein, among other devices, such as those discussed below with reference to FIG. 12. For example, computing device 1210 is one example computer system that may be used to perform the disclosed techniques. In various embodiments, some of the method elements shown may be performed concurrently, in a different order than shown, or may be omitted. Additional method elements may also be performed as desired.

At 610, in the illustrated embodiment, a computer system processes, using a trained machine learning model, a set of data, wherein the set of data includes at least one adversarial attack. For example, the set of data may include multiple electronic transactions to be authorized. If the computer system determines during processing that one or more of these transactions are fraudulent, the computer system denies these transactions. The adversarial attack might be a transaction which has been altered in some way in order to illicit a particular response from the computer system. Due to the machine learning model being generated using sparse perturbed training examples, however, the computer system may identify that this transaction is an adversarial attack and as such should be rejected. Thus, machine learning models trained using the disclosed techniques advantageously prevent or reduce erroneous classifications for e.g., fraudulent transactions.

At 620, the computer system determines, based on output of the trained machine learning model, whether to reject data included in the set of data that is associated with the at least one adversarial attack. As discussed above with reference to element 610, for example, the computer system may deny the transactions that is an adversarial attack. In various embodiments, element 620 includes various sub-elements, such as elements 630, 640, and 650. For example, elements 630-650 may be performed as part of the determining whether to reject data included in the set of data.

At 630, the trained machine learning model is generated by perturbing, using a set of adversarial attack methods, a set of training examples used to train machine learning models. In some embodiments, the set of adversarial attack methods includes one or more of the following types of adversarial attack methods: Fast Gradient Sign Method (FGSM), Iterative Fast Gradient Sign Method (I-FGSM), and Advanced Adversarial Network (ADVGN).

At 640, the trained machine learning model is further generated by identifying, from among the perturbed set of training examples, a set of sparse perturbed training examples that are usable to train machine learning models to identify adversarial attacks. In some embodiments, the set of sparse perturbed training examples includes examples whose perturbations are below a perturbation threshold and whose classifications are above a classification difference threshold.

At 650, the trained machine learning model is further generated by training, using the set of sparse perturbed training examples, the machine learning model. In some embodiments, the training includes inputting the set of sparse perturbed training examples and the set of training examples into the classifier. In some embodiments, the training includes backpropagating the set of sparse perturbed training examples through the classifier to identify error associated with respective nodes of the classifier.

Example Meta-Learning

Generally, machine learning models are prone to deterioration over time as the underlying feature distribution used to originally train these models changes. For example, in the context of electronic transactions, a system which processes transactions may introduce a new feature into the transaction process, such as a product description feature or a new country code feature. As a result, a machine learning classifier trained on older data may not be able to provide accurate classifications for transactions processed by this system relative to prior transactions. Not only may machine learning models deteriorate over time, but also the examples used to train such models may not be readily available due to delays in manual labeling of transactions (e.g., as fraudulent or not) after processing. These delays may range from weeks to months, thereby limiting the ability of models to train on recent transactions. Further, the manual labeling process may be hierarchical in nature and, therefore, may be prone to mislabeling. As one specific example in the context of electronic monetary transactions, a transaction may be mislabeled as associated with a stolen credit card, when indeed this transaction should be labeled as associated with an account takeover (ATO) (e.g., a malicious user has stolen a username and password of another user).

Techniques are disclosed for automatically retraining machine learning models based on detecting deterioration in the models due to temporal changes in training data. For example, one or more features included in the training data may change over time. Such techniques include a training framework that causes machine learning models to meta-learn underlying training features. In addition, the meta-learning includes techniques for automatically checking for and correcting erroneously labeled training examples (examples used to train the machine learning models). The automatic retraining in addition to the erroneous label checking may advantageously improve and maintain the accuracy of machine learning models over time. As used herein, the term "meta-learn" includes the process of teaching a machine learning model how to understand its own learning process with minimal manual intervention. For example, a machine learning classifier capable of meta-learning might be one that can adapt to new tasks and new environments that were not previously encountered during training.

In contrast to certain techniques which often include manual retraining of machine learning models by a system administrator or developer, the disclosed techniques automatically retrain machine learning models via meta-learning. The disclosed techniques include implementation of a generative model that determines the distribution of data processed by a machine learning model. This generative model summarizes the data distribution and identifies when new data processed by the machine learning model deviates from this summary. For example, the generative model produces a summary of various features included in training examples. Based on new features deviating from the original feature distribution summary more than a threshold amount, the generative model notifies a machine learning model training system, triggering a retrain process, which uses examples with the new features as training data. Based on this trigger, the machine learning model begins a retraining process using the new data as training data. The automatic retraining may also be triggered based on a current machine learning model failing to satisfy a performance threshold. For example, if a current model is performing worse than a benchmark model (e.g., trained using manual techniques), then the disclosed system may retain the model. As one specific example, of a fraud detection model is catching less than 90% of fraud (e.g., at least 90% of the transactions the model classifiers as fraud are indeed fraud), then this model might require retraining.

The disclosed automatic retraining techniques may improve the accuracy of machine learning models in processing data stemming from applications associated with new features (e.g., a mobile application has introduced a new customer review feature for electronic transactions). In addition, the disclosed meta-learning may prolong the relevance, applicability, and usefulness of machine learning models relative to those generated via traditional training techniques e.g., manual training. Further, the disclosed automated labeling techniques may advantageously identify and correct erroneously labeled transactions. Using automated meta-learning techniques may reduce latency associated with identifying erroneously labeled transaction relative to manual retraining of such models. For example, instead of waiting for a user to report credit card fraud for a transaction that occurred weeks earlier, the disclosed auto-labeling system may identify that a transaction has been mis-labeled as account takeover based on contextual information available for this transaction (e.g., from a backend system that collects from various information that paints a picture of the context in which the transaction was executed).

Figure 7:
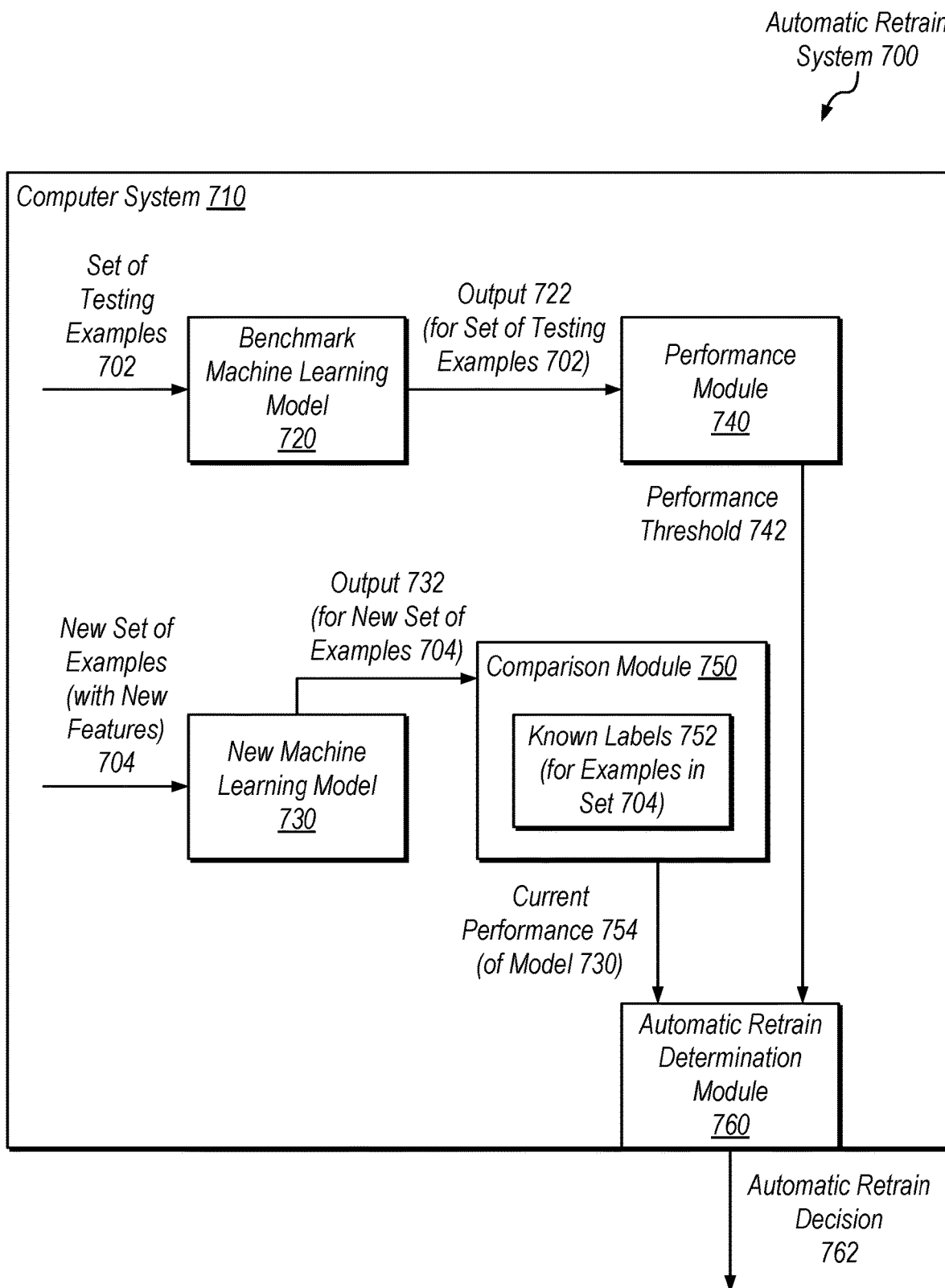
FIG. 7 is a block diagram illustrating an example system configured to determine whether to automatically retrain a trained machine learning model, according to some embodiments.

FIG. 7 is a block diagram illustrating an example system configured to determine whether to automatically retrain a trained machine learning model. In the illustrated embodiment, automatic retrain system 700 includes a computer system 710, which in turn includes a benchmark machine learning model, a performance module 740, a comparison module 750, a new machine learning model 730, and an automatic retrain determination module 760. These modules, as well as all other modules discussed herein, may be implemented as stored computer-executable instructions according to various embodiments.

Computer system 710, in the illustrated embodiment, inserts a set 702 of testing examples into benchmark machine learning model 720. This set 702 of testing examples is used to establish a benchmark of performance for various machine learning models by testing the performance of the benchmark model 720 after it has been trained using traditional techniques (e.g., manual training). As such, labels are known for examples in the set 702 of testing examples. The set 702 of testing examples may be retrieved by computer system 710 from the database 150 shown in FIG. 1, for example.

In the illustrated embodiment, benchmark model 720 generates output 722 for examples in the set 702. This output 722 includes classifications, for example, in scenarios in which benchmark model 720 is a machine learning classifier. Example machine learning classifiers are discussed above with reference to FIG. 1. Performance module 740 determines a performance threshold 742 based on the output 722 of benchmark model 720. That is, computer system 710 uses model 720 as a benchmark for measuring the performance of other models. Performance module 740 provides the performance threshold 742 to automatic retrain determination module 760.

In various embodiments, the performance threshold 742 includes two different thresholds. For example, the first threshold is a classification performance threshold, while the other threshold is a feature difference threshold. The classification performance threshold is determined based on classifications output by the benchmark model 720. As one specific example, benchmark model 720 predicts that 4% of a set of one million transactions are fraudulent and, according to known labels for these transactions, 90% of those 4% are truly fraud. In this example, the benchmark model 720 is 90% accurate. Based on this evaluation, performance module 740 may set the classification performance threshold as 90%. Further, in this example, if computer system 710 determines that classifications output by new machine learning model 730 for examples in the new set 704 are less than 90% accurate, then this new model 730 does not satisfy the classification performance threshold. Said another way, in this example, the new model 730 is not performing as well as the benchmark model 720 and, therefore, might require further training.

As used herein, the term "known label" refers to a given classification that has been assigned to a machine learning example based on various information available for this example indicating the given classification. A known label for an example may be available a given amount of time after an example has been processed. Labels for transactions may be available within days, weeks, months, etc. of initiation of the transaction. Further in this example, a user may report to a transaction processing system that there has been a fraudulent charge to their credit card seven days after this charge was initiated. Thus, the known label (i.e., credit card fraud) for this transaction is available a week after the transaction was processed. Based on this information, the transaction processing system labels this transaction as fraudulent. This labeled transaction is then usable as an example to train various machine learning models. The term "known label" does not preclude the label from being incorrect in certain circumstances (e.g., an electronic transaction could be labeled as fraud even it is legitimate), but nonetheless the label for the transaction is actually known (rather than being unavailable/unknown).

Note that new machine learning model 730 may be generated from benchmark model 720 by retraining the benchmark model using new training examples, e.g., using the disclosed automatic retraining techniques. In some embodiments, new machine learning model 730 replaces the benchmark model 720. For example, new machine learning model 730 may be used instead of benchmark model 720 in production (e.g., to process electronic transactions).

On the other hand, performance module 740 determines the feature difference threshold based on a distribution summary of features included in examples in set 702. Performance module 740 generates the feature distribution summary using a generative model, such as the Gaussian process-based variation auto-encoder (VAE). The feature difference threshold is set based on the feature distribution summary such that as new examples with one or more new features are introduced over time, these new examples trigger a retrain of the new machine learning model 730, for example. That is, the features of the new examples are compared to the feature distribution summary to determine whether a number of new features satisfies the feature difference threshold set by performance module 740. As one scenario, performance module 740 may set the feature difference threshold to two. In this scenario, if new examples in the new set 704 include two or more new features, these examples satisfy the feature difference threshold and, therefore, may trigger automatic retraining of the new model 730.

Computer system 710 inserts a new set 704 of examples with one or more new features into new machine learning model 730. New machine learning model 730 generates output 732 for examples in the new set 704. Comparison module 750, in the illustrated embodiment, compares known labels 752 for examples in the new set 704 with the output 732 generated by new model 730 for corresponding examples. Based on the comparison, module 750 provides a current performance 754 assessment of new model 730 to automatic retrain determination module 760.

Automatic retrain determination module 760, in the illustrated embodiment, generates an automatic retrain decision 762 for new model 730 based on comparing the current performance 754 of this model with performance threshold 742. In some embodiments, the automatic retrain decision 762 automatically triggers retraining of the new machine learning model 730. As discussed above, if this model is performing below a classification threshold or if the distribution of features included in examples used to generate the new model (prior to retraining) changes more than a threshold amount, or both thresholds are satisfied, then the disclosed system automatically triggers retraining of this new model. In some embodiments, computer system 710 outputs the automatic retrain decision 762 to another system configured to retrain new machine learning model 730. In other embodiments, computer system 710 retrains new machine learning model 730 based on automatic retrain decision 762.

In some embodiments, automatic retrain system 700 performs the automatically retraining on a rolling basis by selecting a new starting timestamp from which to collect a set of testing examples. The set 702 of testing examples shown in the illustrated embodiment may be selected from a first timestamp, while the new set 704 of examples is selected from a second timestamp that is a week later than the first timestamp. Computer system 710 may periodically check whether retraining is necessary by selecting a different set 702 of testing examples and a different new set 704 of examples from timestamps that are "rolled" to a week later than their original respective timestamps. In this way, computer system 710 evaluates the performance of the new machine learning model 730 on a rolling basis (e.g., a rolling window of a week).

Figure 8A:
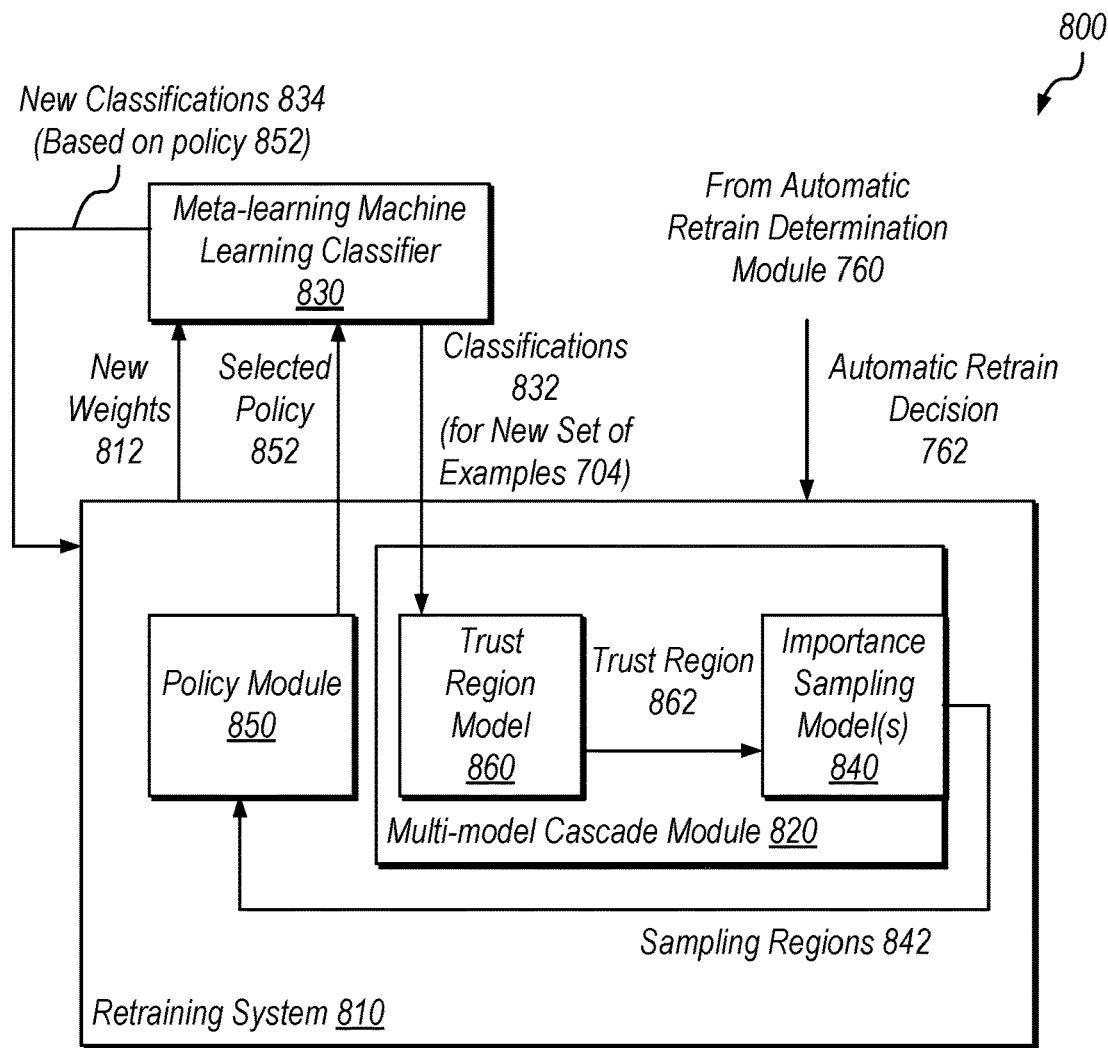
FIGS. 8A and 8B are diagrams illustrating an example retraining system and example importance sampling, respectively, according to some embodiments.

FIG. 8A is a block diagram illustrating an example retraining system. In the illustrated embodiment, system 800 includes a meta-learning machine learning classifier 830 and a retraining system 810, which in turn includes a policy module 850 and a multi-model cascade module 820. Note that meta-learning machine learning classifier 830 is one example of the new machine learning model 730 discussed above with reference to FIG. 7.

Retraining system 810, in the illustrated embodiment, receives automatic retrain decision 762 from automatic retrain determination module 760. Based on this decision 762 indicating that meta-learning machine learning classifier 830 requires additional training, retraining system 810 requests classifications 832 from classifier 830 for examples in the new set 704.

Multi-model cascade module 820, in the illustrated embodiment, includes a trust region model 860 and one or more importance sampling models 840. Multi-model cascade module 820 implements a multi-model cascade process using various different optimization methods. In the illustrated embodiment, trust region model 860 determines a trust region 862 for classifier 830 based on the classifications 832 output by this model. For example, multi-model cascade module 820 may use a first model such as a trust region policy optimization (TRPO) model to determine the trust region. This first model may build the trust region which follows the gradient of classifications output by a trained machine learning classifier. Trust regions allow for a broader exploration of the search space (e.g., the trust region does not always follow the trajectory of the gradient descent of classifier 830) by indicating a subset of a set of regions to proceed to (e.g., policies to implement for classifier 830). Example regions are discussed below with reference to FIG. 8.

The trust region generated by the TRPO model may be a convex, bowl-like area which includes a global minimum. This convex trust region is then used to determine whether classifications for new, unlabeled data deviate from a known distribution of classifications output by the trained machine learning classifier. In some embodiments, the TRPO model implements importance sampling in order to reduce the number of directions to be monitored for the trust region. Importance sampling may allow the meta-learning classifier to identify one or more directions in which multiple features have shifted within a particular time interval, which in turn may improve the efficiency of the disclosed meta-learning techniques relative to implementation without importance sampling. For example, in the transaction processing context, importance sampling may take into consideration various weighting criteria that are specific to the fraud domain, such as weighting training examples associated with greater potential loss (e.g., transactions associated with a large dollar amount relative to other transactions).

Multi-model cascade module 820 then uses a second model (i.e., an importance sampling model 840) to determine one or more sampling regions 842 relative to the determined trust region. For example, module 820 may use a second model such as a proximal policy optimization (PPO) model to determine the sampling regions 842. Module 820 may further implement a third model instead of or in addition to the second model, such as an evolve policy gradient method, to determine sampling regions 842. In some embodiments, importance sampling includes identifying, using a second model of the multi-model cascade process, one or more features whose variance satisfies a variance threshold and removing the identified features from the trust region. Such techniques allow the multi-model cascade module 820 to identify features in the training data that are unstable over time (e.g., features that cause greater changes in classifications relative to other features). Identification of such features may allow the retraining system 810 to reduce variance in performance of the retraining of meta-learning classifier 830 (e.g., due to noisy features).

That is, second and third models used in the multi-model cascade process may further be used to reduce noisy classifications by reducing the importance of some features (which are unstable over time) relative to other features included in training examples used to train the machine learning classifier. This second stage of the cascade process may further stabilize the performance of the meta-learning performed by the machine learning classifier. The multi-model cascade process utilizes a collection of feature selection methods using custom-defined submodular optimization cost functions and optimizers to determine one or more features that are associated with high contribution to machine learning model performance relative to other features. In addition, the multi-model cascade process yields a robust meta-learning classifier by accounting for changes in underlying data over time (e.g., changes in the underlying feature distribution used to train the machine learning model).

Policy module 850, in the illustrated embodiment, receives sampling regions 842 from importance sampling model(s) 840 and selects a policy 852 associated with one of these regions to implement during retraining of meta-learning classifier 830. Retraining system 810 alters classifier 830 according to the selected policy 852. Once system 810 is finished altering classifier 830, it inputs the new set 704 of training examples into the altered classifier. The altered classifier 830 outputs new classifications 834 for examples in the new set 704 based on policy 852. Retraining system 810 then uses these new classifications 834 to assign new weights 812 to examples in the new set 704 of examples for additional training of classifier 830. For example, as new data (with new features) is input to classifier 830, this model needs to be retrained using updated policies to be able to accurately make predictions for new types of data (i.e., with new features). If classifier 830 were to continue implementing the same policies during classification of new examples with new features, the accuracy of this model is likely to deteriorate over time.

In various embodiments, prior to inputting examples into meta-learning machine learning classifier 830, retraining system 810 transforms these examples using one or more data transformation techniques. For example, retraining system 810 may implement one or more of the data transformation techniques discussed above with reference to FIG. 1. In some embodiments, retraining system 810 inputs both the new set 704 of examples and the set 702 of testing examples into classifier 830 during retraining. In such scenarios, retraining system 810 transforms both sets 702 and 704 of data prior to insertion into classifier 830. Retraining system 810 may iteratively perform the retraining techniques discussed herein until this system is satisfied with the output of the classifier e.g., based on comparing the output of the model with known labels for the examples in the new set 704 or set 702, or both.

Figure 8B:
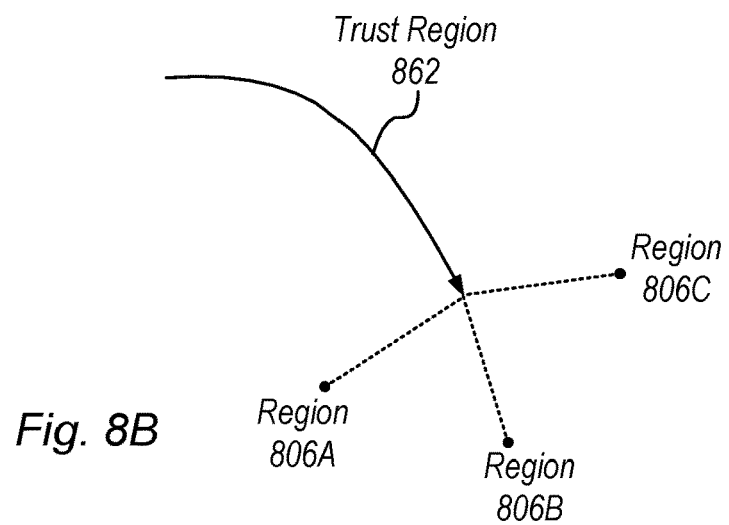

FIG. 8B is a diagram illustrating an example of the importance sampling performed by the one or more importance sampling models 840 discussed above with reference to FIG. 8A. In the illustrated embodiment, trust region 862 is shown along a trajectory. Three different examples 806A-806C of the sampling regions 842 for this trust region 862 are shown branching off into various direction from this trajectory. Note that region 806B is along the same trajectory as the trust region 862. In this example, the solid line represents the trust region of output generated by the meta-learning machine learning model, while the dotted line segments (to various regions 806) represent potential learned or adapted outputs of the meta-learning classifier after automatic retraining.

Example Auto-Labeling

Figure 9:
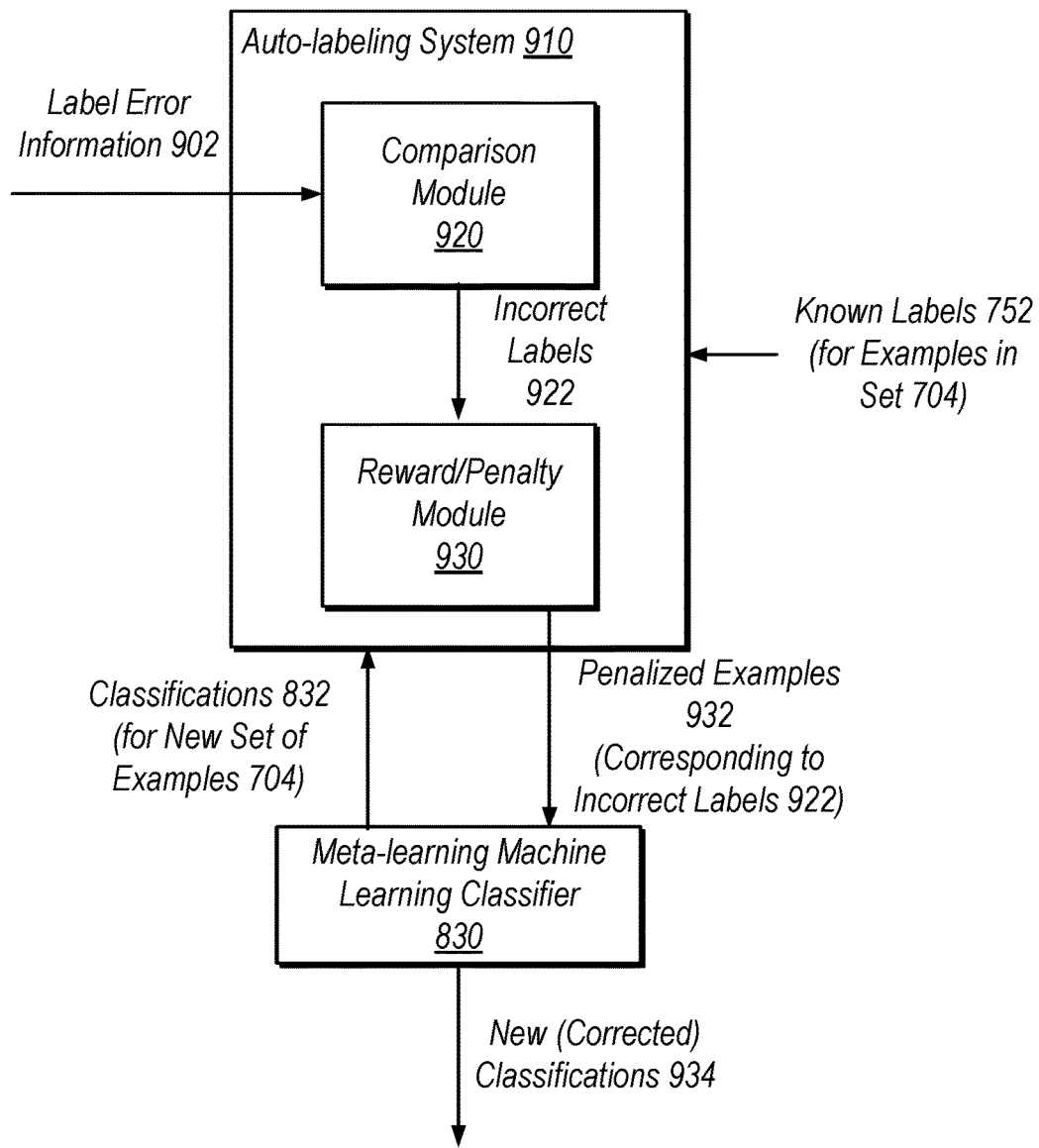
FIG. 9 is a block diagram illustrating an example auto-labeling system, according to some embodiments.

FIG. 9 is a block diagram illustrating an example auto-labeling system. In the illustrated embodiment, system 900 includes meta-learning machine learning classifier 830 and an auto-labeling system 910, which in turn includes a comparison module 920.

Auto-labeling system 910, in the illustrated embodiment, receives known labels 752 for examples in new set 704. For example, computer system 710 may send these examples to system 910 for determining whether these labels have been assigned in error. Auto-labeling system 910 also receives label error information 902 from an internal activity tracking system. As used herein, the term "label error information" includes information that is available from various data sources internal to the disclosed auto-retrain system and that is indicative of whether examples being used by the automatic retrain system to retrain various machine learning models have been erroneously labeled. For example, the label error information might include indicators that a transaction that has been labeled as credit card fraud is actually a transaction submitted from an account that has been hacked (i.e., an account takeover). Said another way, the label error information for a given example may be inconsistent with the label currently assigned this example, indicating that this label is wrong.

For example, this activity tracking system might observe an original label assigned to an example (e.g., by a system administrator) as well as other indicators associated with this example. These other indicators may indicate that this example has been mislabeled, for example. For example, when classifying transactions, auto-labeling system 910 may receive indicators based on transaction information that is available after a transaction has been processed. As one specific example, a transaction may be labeled as an account takeover due to suspicious activity on a user's credit card. A week later, however, this user reports that they lost their credit card, indicating that this transaction should have been labeled as credit card fraud rather than an account takeover. Such information may be collected by an internal label monitoring system (e.g., a part of computer system 710) that collects information associated with transactions after they have been processed. In some embodiments, this information is collected from multiple different sources and reported to auto-labeling system 910. For example, merchant and customer information may be monitored during transaction processing including their behavior history. In some situations, this information may indicate that a customer account has a been taken over, credit car fraud, some form of electronic transaction fraud, or any of various other types of suspicious activity.

In the illustrated embodiment, if multiple indicators are showing inconsistencies with the currently assigned label for a given example, comparison module 920 determines that the currently assigned label is incorrect. Comparison module 920 outputs one or more labels 922 that it has determined to be incorrect. The incorrect labels 922 are then provided to reward/penalty module 930.

Reward/penalty module 930, in the illustrated embodiment, compares classifications 832 output by classifier 830 for examples in the new set 704 of examples with known labels 752 for corresponding examples to determine how much they differ. Based on the amount that they differ as well as whether the known labels have been identified as incorrect, module 930 assigns rewards and/or penalties to these examples. For example, in the illustrated embodiment, module 930 assigns penalties to examples corresponding to the incorrect labels 922 identified by comparison module 920. These penalized examples 932 are then backpropagated through classifier 830 using the meta-learning techniques discussed above with reference to FIGS. 8A and 8B. Once classifier 830 has been retrained using the penalized examples, this classifier outputs new corrected classifications 934 for examples in the new set 704 of examples.

Module 930 assigns penalties to examples based on the difference between the classification output by classifier 830 and the correct label in the embodiment shown. Auto-labeling system 910 determines correct labels for incorrectly labeled examples by observing the label error information 902 associated with these examples. Once system 910 has determined the correct labels for the mis-labeled examples, this system determines penalties for the incorrectly labeled examples. For example, if the classification for a particular training example is 0.9, while the correct label is 0, then a reward/penalty module 930 might assign a penalty of 0.9 (0.9-0) to this example (e.g., a heavy penalization). In contrast, for correctly labeled examples, module 930 provides awards. As one specific example, if the correct label is 1 and the classification is 0.9, then module 930 might assign a reward of 0.1. These penalized examples 932 and rewarded examples are then backpropagated through meta-learning classifier 830 such that this classifier learns to generate new corrected classifications 934 for these examples. Backpropagating these examples through classifier 830 retrains the model by fine tuning the model's trust region.

These label checking techniques attempt to identify erroneously labeled examples such that the meta-learning classifier can be retrained using correctly labeled examples. In this way, the meta-learning classifier will perform better than classifiers trained using examples whose known labels have not been verified. In various embodiments, retraining system 810 uses the penalized (or rewarded examples) provided by auto-labeling system 910 to perform iterative retraining using the importance sampling techniques discussed above with reference to FIGS. 8A and 8B. That is, auto-labeling system 910 may use the meta-learning techniques discussed above, including the different gradient directions discussed with reference to FIG. 8B, to retrain meta-learning classifier 830 using the new correct labels determined by auto-labeling system 910.

Consider an example in which a classification output by meta-learning classifier 830 is 0.3. In this example, if the known label for this transaction is 0 (indicating the transaction is not fraudulent), but the label error information indicates that the known label is incorrect, comparison module 920 flags this transaction as incorrectly labeled. Accordingly, reward/penalty module 930 might assign a heavy penalty to this transaction based on the classification 0.3 being close to the incorrect label. For example, module 930 might assign a penalty of 0.7 (1 minus 0.3) to this example in anticipation of the correct label being 1 (indicating the transaction is fraudulent). In other situations, module 930 might assign a penalty of 0.3 divided by 0.7.

In various embodiments, the assignment of penalties and rewards performed by reward/penalty module 930 may be performed dynamically over time. That is, module 930 may implement a cost function that fine-tunes assigned weights to train meta-learning classifier 830 to properly classify new examples whose feature distribution changes over time.

Example Methods

FIG. 10 is a flow diagram illustrating a method 1000 for automating iterative retraining of a machine learning model, according to some embodiments. The method shown in FIG. 10 may be used in conjunction with any of the computer circuitry, systems, devices, elements, or components disclosed herein, among other devices, such as those discussed below with reference to FIG. 12. For example, computing device 1210 is one example computer system that may be used to perform the disclosed techniques. In various embodiments, some of the method elements shown may be performed concurrently, in a different order than shown, or may be omitted. Additional method elements may also be performed as desired.

At 1010, in the illustrated embodiment, a computer system compares output of a new machine learning model for a new set of examples with known labels for examples in the new set of examples, where the new set of examples includes one or more new features. The new machine learning model may be an existing machine learning classifier that has been trained using a benchmark set of data (e.g., set 702 of testing examples). Over time the new machine learning classifier begins to differ from models trained using the benchmark set of data due to the disclosed automatic and iterative retraining of this new model using training examples with one or more new features. The computer system may be any of various computing devices, servers, etc. such as those discussed below with reference to FIG. 12. For example, computing device 1210 is one example computer system that may be used to perform the disclosed techniques.

At 1020, the computer system determines, based on the comparing, whether a current performance of the new machine learning model satisfies a performance threshold for machine learning models, where the performance threshold is based on output of a benchmark machine learning model. In some embodiments, the performance threshold is further based on a distribution summary of features included in a set of testing examples used to test the performance of the benchmark machine learning model, where the distribution summary is generated using a generative model. The generative model might be a Gaussian process-based Variation Auto-Encoder (VAE), for example.

At 1030, in response to determining that the current performance of the new model does not satisfy the performance threshold, the computer system automatically triggers retraining of the new model. The performance of the new machine learning may be measured based on moving averages, temporal plots, or both. If the disclosed system identifies deterioration of the model according to performance threshold 742, then the meta-learning process may be triggered. In other embodiments, the retraining process may be set to trigger periodically based on a pre-defined time interval (e.g., specified by a system administrator).

In some embodiments, the determination to automatically trigger retraining of the new model is performed based on multiple different objectives. For example, in addition to considering whether one or more new features have been introduced (based on the features of new examples differing from the distribution summary), the computer system may consider: the proportion of false positives to correct classifications (e.g., a number of good transactions which the trained meta-learning classifier incorrectly predicts as fraud), a proportion of correctly classified examples (e.g., true fraud that is correctly identified), temporal sensitivity (e.g., to what extent do the features of these examples vary over time), whether one or more new features have been introduced, known times of increasing attacks (e.g., increase in fraudulent transactions during a holiday season), which subpopulations of transactions (e.g., credit card, person-to-person, merchant-to-customer, etc.) suffer from the largest inaccuracies in classifications, etc.

In some embodiments, the retraining includes determining, using a first model of a multi-model cascade process, a trust region, where the trust region is determined based on classifications output by the new model for the new set of examples. The first model may be a trust region policy optimization (TRPO) model, for example. In some embodiments, the retraining further includes performing, using a second, different model of the multi-model cascade process, importance sampling for one or more regions relative to the trust region, where results of the importance sampling indicate one or more regions for altering performance of the new model relative to a traditional gradient descent trajectory of the new model. The second model may be a proximal policy optimization method, for example, that reduces the importance of features that are unstable over time. The second model may be an evolved policy gradient method, for example, which may be used to lessen the variance in performance of the meta-learning machine learning model by identifying features that are causing a threshold amount of shift in the model's classifications.

In some embodiments, the importance sampling includes selecting a region from the one or more regions relative to the trust region and then generating, based on a policy associated with the selected region, new classifications for the new set of examples. In some embodiments, the importance sampling further includes assigning, based on the new classifications, weights to one or more examples in the new set of examples. For example, as new data with new features is submitted for processing, the meta-learning classifier needs to be retrained to update its policies in order to accurately make predictions for new features.

In some embodiments, the computer system determines, after the retraining, whether the known labels for examples in the new set of examples are correct, where the determining includes comparing classifications output by the new model for examples in the new set of examples and the known labels with label error information. For example, the disclosed meta-learning techniques are performed relative to a source of truth (i.e., known labels for various examples). In order to ensure that the meta-learning is as accurate as possible, the source of truth needs to be checked after the meta-learning is complete and further training may be necessary if the source of truth is determined to be wrong. For example, the meta-learning machine learning model might output a classification of 0.05 for a transaction and the known label for this transaction is 0; however, in this example, the correct label is 0 (the known label of 0 is identified as incorrect by the system). In this example, the label error information indicates that the correct label is 1.

In some embodiments, the label error information includes information from a plurality of sources and indicates probabilities that one or more of the known labels for examples in the new set of examples are incorrect. In some embodiments, the computer system assigns, based on determining that one or more known labels for examples in the new set of examples are incorrect, new weights to examples corresponding to the one or more incorrect labels, where values of the new weights are determined based on the classifications output by the new model for examples in the new set of examples and the label error information. For example, if a week after a transaction is processed the label error information indicates that the known label for a transaction is different than what the meta-learning classifier is predicting, then the disclosed system assigns a penalty to this transaction prior to backpropagating it through the meta-learning classifier (e.g., classifier 830).

In some embodiments, the retraining includes, prior to the new model generating classifications, transforming examples in the new set of examples and the new set of examples, where the transforming is performed using at least one data transformation technique selected based on one or more types of features included in the new set of examples. For example, the computer system may perform z-scaling, weight of evidence, or both techniques in order to transform examples prior to being input into meta-learning machine learning classifier 830.

In some embodiments, the new set of examples that includes one or more new features are recorded within a first time interval, where determining the current performance of the new model is performed iteratively based on a moving average of the output of the new model for examples recorded over multiple consecutive iterations of the first time interval. For example, the automatic retraining techniques discussed herein may be performed iteratively based on a week-to-week moving average of classifications output by the meta-learning classifier over a month. In this example, known labels are often available a week after transaction is initiated. Therefore, observing a week-to-week moving average of the meta-learning classifier's output allows the disclosed retraining system to more accurately retrain the meta-learning classifier.

In some embodiments, the auto-labeling generates labels for examples in addition to correcting erroneously labeled examples. That is, the auto-labeling system might generate labels for unlabeled examples based on label error information in addition to identifying mis-labeled examples. Such label generation may be used in place of or to augment current manual tagging processes, which in some instances are error-prone.

Note that various examples herein classify transactions as fraudulent or not, but these examples are discussed for purposes of explanation and are not intended to limit the scope of the present disclosure. In other embodiments, any of various machine learning techniques as well as various types of classifications may be implemented.

FIG. 11 is a flow diagram illustrating a method 1100 for correcting mis-labeled examples used to train automatically retrain a trained machine learning model, according to some embodiments. The method shown in FIG. 11 may be used in conjunction with any of the computer circuitry, systems, devices, elements, or components disclosed herein, among other devices, such as those discussed below with reference to FIG. 12. For example, computing device 1210 is one example computer system that may be used to perform the disclosed techniques. In various embodiments, some of the method elements shown may be performed concurrently, in a different order than shown, or may be omitted. Additional method elements may also be performed as desired.

At 1110, in the illustrated embodiment, a computer system performs an auto-labeling process for a set of examples used to iteratively train a machine learning model. For example, this auto-labeling process is discussed in further detail above with reference to FIG. 9.

At 1120, as part of the auto-labeling process, the computer system determines whether known labels for examples in the set of examples are correct, where the determining includes comparing classifications output by the machine learning model for examples in the set of examples and the known labels for the set of examples with label error information. In some embodiments, the label error information includes information from a plurality of sources indicating probabilities that one or more of the known labels for examples in the set of examples are incorrect. In one specific example in the PAYPAL context, the label error information may be collected from various PAYPAL assets and data sources.

At 1130, as part of the auto-labeling process, the computer system assigns, based on determining that one or more of the known labels are incorrect, penalties to examples corresponding to the one or more incorrect labels. In some embodiments, the auto-labeling process further includes determining, based on the label error information, correct labels for the examples corresponding to the one or more incorrect labels. In some embodiments, the auto-labeling process further includes backpropagating, through the machine learning model, the penalized examples with corresponding determined correct labels, where the backpropagating retrains the machine learning model such that the model outputs classifications corresponding to the determined correct labels. In some embodiments, the correctly labeled examples are used in future rounds of iteratively training the machine learning model. The reward/penalty model implemented by the auto-labeling system 910 discussed above with reference to FIG. 9 may be referred to as a cost function.

In some embodiments, values of the assigned penalties are determined based on the classifications output by the machine learning model for examples in the set of examples and the label error information. In some embodiments, values of the assigned penalties are determined by identifying, based on the label error information, correct labels for the examples corresponding to the one or more incorrect labels. In some embodiments, the values of the assigned penalties are further determined by determining, based on differences between the one or more incorrect labels and the identified correct labels for corresponding examples, penalty values.

Example Computing Device

Figure 12:
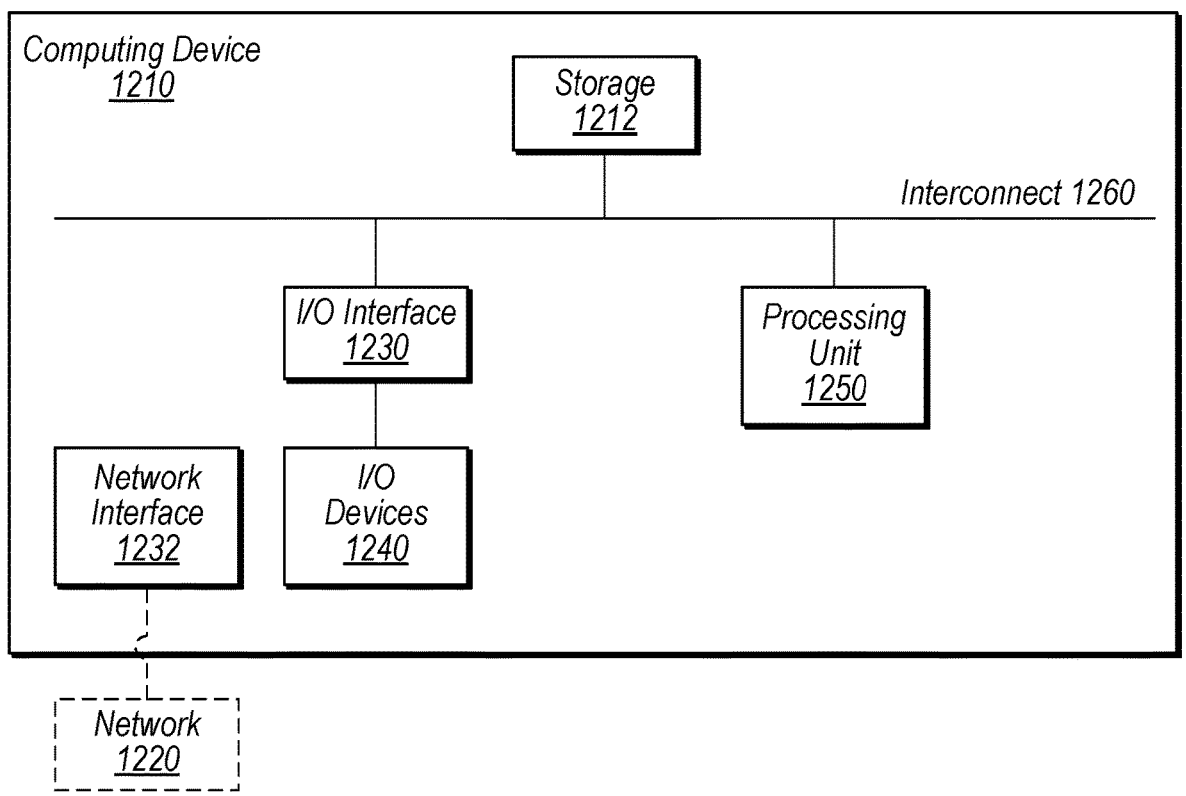
FIG. 12 is a block diagram illustrating an example computing device, according to some embodiments.

Turning now to FIG. 12, a block diagram of one embodiment of computing device (which may also be referred to as a computing system) 1210 is depicted. Computing device 1210 may be used to implement various portions of this disclosure. Computing device 1210 may be any suitable type of device, including, but not limited to, a personal computer system, desktop computer, laptop or notebook computer, mainframe computer system, web server, workstation, or network computer. Note that various machine learning techniques discussed herein may be performed by computing device 1210, for example. As shown, computing device 1210 includes processing unit 1250, storage 1212, and input/output (I/O) interface 1230 coupled via an interconnect 1260 (e.g., a system bus). I/O interface 1230 may be coupled to one or more I/O devices 1240. Computing device 1210 further includes network interface 1232, which may be coupled to network 1220 for communications with, for example, other computing devices.

In various embodiments, processing unit 1250 includes one or more processors. In some embodiments, processing unit 1250 includes one or more coprocessor units. In some embodiments, multiple instances of processing unit 1250 may be coupled to interconnect 1260. Processing unit 1250 (or each processor within 1250) may contain a cache or other form of on-board memory. In some embodiments, processing unit 1250 may be implemented as a general-purpose processing unit, and in other embodiments it may be implemented as a special purpose processing unit (e.g., an ASIC). In general, computing device 1210 is not limited to any particular type of processing unit or processor subsystem.

Storage subsystem 1212 is usable by processing unit 1250 (e.g., to store instructions executable by and data used by processing unit 1250). Storage subsystem 1212 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1212 may consist solely of volatile memory, in one embodiment. Storage subsystem 1212 may store program instructions executable by computing device 1210 using processing unit 1250, including program instructions executable to cause computing device 1210 to implement the various techniques disclosed herein.

I/O interface 1230 may represent one or more interfaces and may be any of various types of interfaces configured to couple to and communicate with other devices, according to various embodiments. In one embodiment, I/O interface 1230 is a bridge chip from a front-side to one or more back-side buses. I/O interface 1230 may be coupled to one or more I/O devices 1240 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise.

Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A method, comprising:
   perturbing, by a computer system using a set of adversarial attack methods, a set of training examples used to train a machine learning model;
   identifying, by the computer system from among the perturbed set of training examples, a set of sparse perturbed training examples that are usable to train machine learning models to identify adversarial attacks, wherein the set of sparse perturbed training examples includes examples whose perturbations are below a perturbation threshold and whose classifications satisfy a classification difference threshold; and
   retraining, by the computer system using the set of sparse perturbed training examples, the machine learning model.

2. The method of claim 1, wherein identifying the set of sparse perturbed training examples includes:
   comparing classifications of examples in the perturbed set of training examples with classifications of corresponding unperturbed examples in the set of training examples; and
   determining, based on the comparing, whether classifications of examples in the perturbed set of training examples satisfy the classification different threshold.

3. The method of claim 1, further comprising:
   transforming, by the computer system prior to the perturbing, the set of training examples, wherein the transforming is performed using at least one data transformation technique selected based on one or more types of features included in the set of training examples.

4. The method of claim 3, wherein the at least one data transformation technique is a z-scaling technique.

5. The method of claim 1, wherein the set of adversarial attack methods includes two or more variations of the Carlini Wagner method.

6. The method of claim 1, wherein the machine learning model is a classifier, and wherein the retraining includes:
   inputting the set of sparse perturbed training examples and the set of training examples into the classifier; and
   backpropagating the set of sparse perturbed training examples through the classifier to identify error associated with respective nodes of the classifier.

7. The method of claim 6, wherein the retraining further includes
   updating, based on the identified error, one or more weights of the respective nodes of the classifier;
   wherein the retraining smooths a gradient of classifications output by the machine learning model for perturbed examples relative to a gradient of classifications output for unperturbed examples.

8. The method of claim 1, wherein the perturbing includes:

identifying one or more features of unperturbed examples in the set of training examples that are changeable by one or more users requesting processing of the unperturbed examples; and altering the one or more identified features of one or more unperturbed examples in the set of training examples.

9. The method of claim 8, wherein the examples are transactions, and wherein the altering includes changing an Internet protocol (IP) address feature for one of the transactions such that the IP address feature indicates a first IP address, and wherein the transaction is requested via a computing device associated with a second, different IP address.

10. The method of claim 1, wherein the retraining includes:

assigning weight values to examples in the set of sparse perturbed training examples based on an amount that examples in the set of training examples are perturbed.

11. A non-transitory computer-readable medium having instructions stored thereon that are executable by a computing device to perform operations comprising:

perturbing, using a set of adversarial attack methods, a set of training examples used to train a machine learning model;

identifying, from among the perturbed set of training examples, a set of sparse perturbed training examples that are usable to train machine learning models to identify adversarial attacks, wherein the set of sparse perturbed training examples includes examples whose perturbations are below a perturbation threshold and whose classifications satisfy a classification difference threshold; and retraining, using the set of sparse perturbed training examples, the machine learning model.

12. The non-transitory computer-readable medium of claim 11, wherein the retraining includes:

assigning, based on a difference in classification values between perturbed examples in the set of sparse perturbed training examples and corresponding unperturbed examples in the set of training examples, weight values to perturbed examples in the set of sparse perturbed training examples.

13. The non-transitory computer-readable medium of claim 11, wherein the set of adversarial attack methods includes a Jacobian-based Salience Map Attack method.

14. The non-transitory computer-readable medium of claim 11, wherein the perturbing includes:

identifying one or more features of unperturbed examples in the set of training examples that are changeable by one or more users requesting processing of the unperturbed examples; and removing, based on the identifying, a particular feature from one or more unperturbed examples in the set of training examples.

15. The non-transitory computer-readable medium of claim 11, wherein the operations further comprise:

transforming, prior to the perturbing, the set of training examples, wherein the transforming is performed using at least one data transformation technique selected based on one or more types of features included in the set of training examples.

16. A method, comprising:

processing, by a computer system using a trained machine learning model, a set of data, wherein the set of data includes at least one adversarial attack;

determining, by the computer system based on output of the trained machine learning model, whether to reject data included in the set of data that is associated with the at least one adversarial attack;

wherein the trained machine learning model is generated by:

perturbing, using a set of adversarial attack methods, a set of training examples used to train machine learning models;

identifying, from among the perturbed set of training examples, a set of sparse perturbed training examples that are usable to train machine learning models to identify adversarial attacks; and training, using the set of sparse perturbed training examples, the machine learning model.

17. The method of claim 16, wherein the trained machine learning model is further generated by:

transforming, prior to the perturbing, the set of training examples, wherein the transforming is performed using at least one data transformation technique selected based on one or more types of features included in the set of training examples.

18. The method of claim 16, wherein the set of sparse perturbed training examples includes examples whose perturbations are below a perturbation threshold and whose classifications are above a classification difference threshold.

19. The method of claim 18, wherein identifying the set of sparse perturbed training examples includes:

comparing classifications of examples in the perturbed set of training examples with classifications of corresponding unperturbed examples in the set of training examples; and determining, based on the comparing, whether classifications of examples in the perturbed set of training examples satisfy the classification difference threshold.

20. The method of claim 16, wherein the set of adversarial attack methods includes one or more of the following types of adversarial attack methods: Fast Gradient Sign Method (FGSM), Iterative Fast Gradient Sign Method (I-FGSM), and Advanced Adversarial Network (ADVGN).

* * * * *